United States Patent
Wei et al.

(10) Patent No.: US 10,932,256 B2
(45) Date of Patent: Feb. 23, 2021

(54) LONG-TERM EVOLUTION COMPATIBLE VERY NARROW BAND DESIGN

(71) Applicant: QUALCOMM Incorporated, San Diego, CA (US)

(72) Inventors: Yongbin Wei, La Jolla, CA (US); Durga Prasad Malladi, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 15/183,702

(22) Filed: Jun. 15, 2016

(65) Prior Publication Data

US 2016/0374080 A1 Dec. 22, 2016

Related U.S. Application Data

(60) Provisional application No. 62/180,599, filed on Jun. 16, 2015.

(51) Int. Cl.
*H04W 72/04* (2009.01)
*H04W 74/08* (2009.01)
*H04L 5/00* (2006.01)

(52) U.S. Cl.
CPC ....... *H04W 72/0446* (2013.01); *H04L 5/0064* (2013.01); *H04W 72/0413* (2013.01); *H04W 74/0833* (2013.01); *H04L 5/0007* (2013.01); *H04L 5/0037* (2013.01); *H04L 5/0044* (2013.01)

(58) Field of Classification Search
CPC ......... H04W 72/0446; H04W 74/0833; H04W 72/0413; H04L 5/0064; H04L 5/0037; H04L 5/0044; H04L 5/0007
USPC ...................................................... 370/336
See application file for complete search history.

(56) References Cited

U.S. PATENT DOCUMENTS

| | | | |
|---|---|---|---|
| 10,211,964 B2* | 2/2019 | Onggosanusi | H04W 72/06 |
| 2009/0245190 A1* | 10/2009 | Higuchi | H04L 47/10 |
| | | | 370/329 |
| 2011/0164659 A1* | 7/2011 | Kawamura | H04B 1/713 |
| | | | 375/133 |
| 2013/0064119 A1* | 3/2013 | Montojo | H04W 36/0061 |
| | | | 370/252 |
| 2013/0070698 A1* | 3/2013 | Kim | H04L 5/0016 |
| | | | 370/329 |
| 2013/0114587 A1 | 5/2013 | Khoryaev et al. | |
| 2013/0194908 A1* | 8/2013 | Gao | H04L 5/0048 |
| | | | 370/203 |
| 2013/0322363 A1 | 12/2013 | Chen et al. | |
| 2014/0038630 A1* | 2/2014 | Kallin | H04W 24/08 |
| | | | 455/452.1 |

(Continued)

FOREIGN PATENT DOCUMENTS

| | | |
|---|---|---|
| CN | 104604315 A | 5/2015 |
| NC | 2018/0004413 | 5/2018 |

(Continued)

OTHER PUBLICATIONS

U.S. Appl. No. 62/112,410, filed Feb. 5, 2015.*

(Continued)

*Primary Examiner* — Faisal Choudhury
(74) *Attorney, Agent, or Firm* — Patterson + Sheridan, L.L.P.

(57) ABSTRACT

Aspects of the present invention relate to wireless communications by a user equipment (UE), comprising, identifying resources in a narrowband region, the narrowband region spanning no more than a single resource block in a transmission time interval (TTI) and communicating with a base station using the identified resources.

33 Claims, 12 Drawing Sheets

(56) References Cited

U.S. PATENT DOCUMENTS

| | | | |
|---|---|---|---|
| 2015/0004937 A1* | 1/2015 | Kremen | H04B 5/0031 455/411 |
| 2015/0201402 A1* | 7/2015 | Morioka | H04W 72/0446 370/329 |
| 2015/0365977 A1* | 12/2015 | Tabet | H04W 72/0406 370/330 |
| 2015/0373649 A1* | 12/2015 | Tabet | H04W 52/24 370/329 |
| 2016/0066193 A1* | 3/2016 | Wang | H04W 16/14 455/454 |
| 2016/0081101 A1* | 3/2016 | Yu | H04W 52/0258 370/329 |
| 2016/0183243 A1* | 6/2016 | Park | H04L 27/04 370/329 |
| 2016/0234707 A1* | 8/2016 | Kazmi | H04W 4/70 |
| 2016/0330265 A1* | 11/2016 | Abdoli | H04L 5/0028 |
| 2017/0041052 A1* | 2/2017 | Blankenship | H04L 1/08 |
| 2017/0111926 A1* | 4/2017 | Madan | H04W 72/1273 |
| 2017/0289973 A1* | 10/2017 | Yang | H04L 27/26 |
| 2018/0103459 A1* | 4/2018 | Liu | H04L 5/0057 |
| 2018/0192419 A1* | 7/2018 | Yi | H04B 7/26 |
| 2018/0248668 A1* | 8/2018 | Hwang | H04W 4/00 |
| 2018/0287761 A1* | 10/2018 | You | H04L 5/0053 |
| 2019/0141705 A1* | 5/2019 | Dalipi | H04W 72/0453 |

FOREIGN PATENT DOCUMENTS

| | | |
|---|---|---|
| RU | 2477021 C2 | 2/2013 |
| WO | 2013173673 A2 | 11/2013 |
| WO | 2014190537 A1 | 12/2014 |

OTHER PUBLICATIONS

Huawei Technologies Co, et al., "Proposed Text for the TR on Physical Broadcast Channels for NB M2M", 3GPP Draft; GPC150031—Proposed Text for the TR on Physical Broadcast Channels for NB M2M V4, 3rd Generation Partnership Project (3gpp), Mobile Competence Centre, 650, Route Des Lucioles, F-06921 S, vol. GERAN WG1, no. Sophia-Antipolis, France, Feb. 2, 2015-Feb. 5, 2015, Feb. 2, 2015 (Feb. 2, 2015), 13 Pages, XP050945140, Retrieved from the Internet: URL: http://www.3gpp.org/ftp/Meetings_3GPP_SYNC/SA6/GERAN/Docs/ [retrieved on Feb. 2, 2015].

International Search Report and Written Opinion—PCT/US2016/037756—ISA/EPO—dated Oct. 17, 2016.

Neul: "Outline Proposal for Clean-Slate Physical Layer", 3GPP Draft, GP-140435, 3rd Generation Partnership Project (3GPP), Mobile Competence Centre, 650, Route Des Lucioles, F-06921 Sophia-Antipolis Cedex, vol. TSG GERAN Aug. 24, 2014 (Aug. 24, 2014), pp. 1-9, XP050779793, Retrieved from the Internet: URL: http://www.3gpp.org/ftp/Meetings_3GPP_SYNC/GERAN/Docs/ [retrieved on Aug. 24, 2014].

Nokia: "LTE-M-Optimizing LTE for the Internet of Things White Paper Nokia Networks Nokia Networks white paper LTE-M-Optimizing LTE for the Internet of Things FutureWorks Contents", May 1, 2015 (May 1, 2015), pp. 1-16, XP055258450, Retrieved from the Internet: URL: http://networks.nokia.com/sites/default/files/document/nokia_lte-m_optimizing_lte_for_the_internet_of_things_white_paper.pdf [retrieved on Mar. 15, 2016].

Lenovo: "DL Physical Control Channels for MTC", 3GPP TSG-RAN WG1#80, R1-150550, Athens, Greece, Jan. 30, 2015, 5 Pages, Feb. 9, 2015-Feb. 13, 2015, Internet URL: http://www.3gpp.org/ftp/tsg_ran/WG1_RL1/TSGR1_80/Docs/R1-150550.zip.

Taiwan Search Report—TW105118948—TIPO—dated May 8, 2020.

Vodafone Group PLC: "CIoT—Coexistence with LTE and UMTS (update of GPC150182)", 3GPP TSG GERAN Ad hoc#2 on FS_IoT_LC GPC150304, Sophia Antipolis, Apr. 23, 2015, pp. 1-7, Apr. 20, 2015-Apr. 23, 2015, https://www.3gpp.org/ftp/tsg_geran/TSG_GERAN/AD-HOCs/Ad-hoc_GERAN1-GERAN2_CIoT/Docs/GPC150304.zip.

\* cited by examiner

LONG-TERM EVOLUTION COMPATIBLE VERY NARROW BAND DESIGN

CROSS-REFERENCE TO RELATED APPLICATION

This application claims priority to U.S. Provisional Patent Application No. 62/180,599, filed on Jun. 16, 2015, and assigned to the assignee hereof and hereby expressly incorporated by reference herein.

FIELD

The present disclosure relates generally to communication systems, and more particularly, to a long-term evolution (LTE) compatible very narrow band (VNB) design for communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Aspects of the present disclosure provide mechanisms for an LTE compatible very narrow band design.

Certain aspects of the present disclosure provide a method for wireless communications by a user equipment (UE). The method generally includes identifying resources in a narrowband region, the narrowband region spanning no more than a single resource block in a transmission time interval (TTI) and communicating with a base station using the identified resources.

Certain aspects of the present disclosure provide a method for wireless communications by a base station (BS). The method generally includes identifying resources in a narrowband region, the narrowband region spanning no more than a single resource block in a transmission time interval (TTI) and communicating with at least one user equipment (UE) using the identified resources.

Certain aspects of the present disclosure provide an apparatus for wireless communications. The apparatus generally includes at least one processor configured to identify resources in a narrowband region, the narrowband region spanning no more than a single resource block in a transmission time interval (TTI), and communicate with a base station using the identified resources, and a memory coupled to the at least one processor.

Certain aspects of the present disclosure provide an apparatus for wireless communications. The apparatus generally includes at least one processor configured to identify resources in a narrowband region, the narrowband region spanning no more than a single resource block in a transmission time interval (TTI) and communicate with at least one user equipment (UE) using the identified resources, and a memory coupled to the at least one processor.

Certain aspects of the present disclosure provide an apparatus for wireless communications. The apparatus generally includes means for identifying resources in a narrowband region, the narrowband region spanning no more than a single resource block in a transmission time interval (TTI) and means for communicating with a base station using the identified resources.

Certain aspects of the present disclosure provide an apparatus for wireless communications. The apparatus generally includes means for identifying resources in a narrowband region, the narrowband region spanning no more than a single resource block in a transmission time interval (TTI) and means for communicating with at least one user equipment (UE) using the identified resources.

Certain aspects of the present disclosure provide a computer-readable medium for wireless communications. The computer readable medium generally includes code to identify resources in a narrowband region, the narrowband region spanning no more than a single resource block in a transmission time interval (TTI), and code to communicate with a base station using the identified resources.

Certain aspects of the present disclosure provide a computer-readable medium for wireless communications. The computer readable medium generally includes code to identify resources in a narrowband region, the narrowband region spanning no more than a single resource block in a transmission time interval (TTI) and code to communicate with at least one user equipment (UE) using the identified resources.

DETAILED DESCRIPTION

Figure 1:
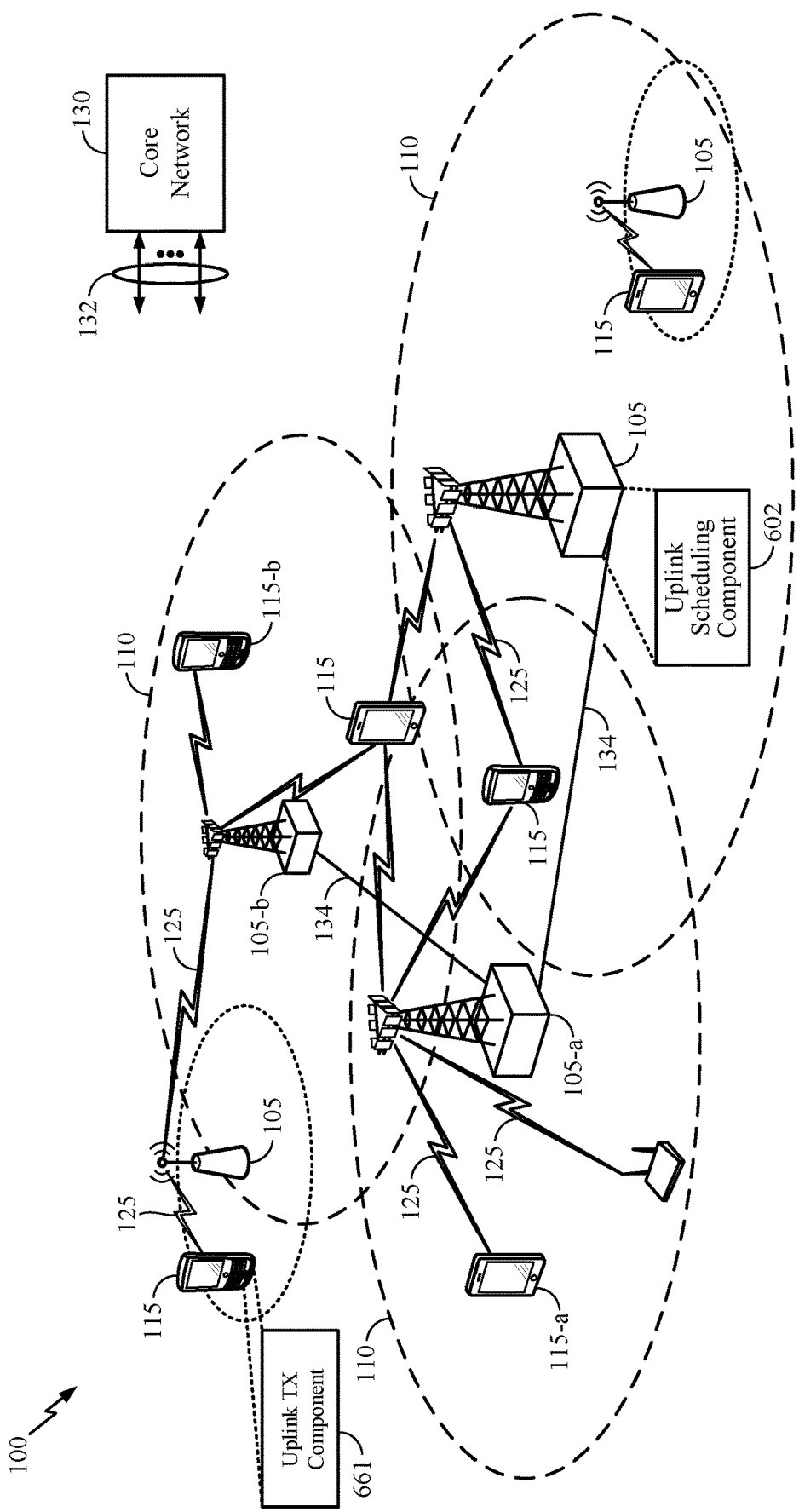
FIG. 1 shows a block diagram conceptually illustrating an example of a telecommunications system, in accordance with an aspect of the present disclosure.

Conventional LTE implementations support a variety of system bandwidths ranging from 1.4 MHz to 20 MHz. The minimum 1.4 MHz bandwidth supports six resource blocks per half millisecond slot. The six resource block minimum is due to the primary synchronization signal (PSS), secondary synchronization signal (SSS), and physical broadcast channel (PBCH) occupying the center six resource blocks. However, certain services and low-power devices may benefit from a very low bandwidth communications technique in order to minimize radio bandwidth usage or reduce power requirements. For example, such services and devices may involve machine type communication(s) (MTC) or enhanced MTC (eMTC).

Aspects of the present disclosure provide techniques for a narrowband transmission spanning a single resource block in an TTI (e.g., 1 ms or 1 subframe). Additionally, the techniques disclosed herein may coexist with existing LTE deployments, or extend and reuse LTE functionalities. LTE, LTE-A (LTE Advanced), and other or future generations of LTE are referred to generally as LTE.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, algorithm(s), hardware description language, or otherwise.

Referring first to FIG. 1, a diagram illustrates an example of a wireless communications system 100, in accordance with an aspect of the present disclosure. The wireless communications system 100 includes a plurality of access points (e.g., base stations, eNBs, or WLAN access points) 105, a number of user equipment (UEs) 115, and a core network 130. Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

In some examples, at least a portion of the wireless communications system 100 may be configured to operate on multiple hierarchical layers in which one or more of the UEs 115 and one or more of the access points 105 may be configured to support transmissions on a hierarchical layer that has a reduced latency with respect to another hierarchical layer. In some examples a hybrid UE 115-*a* may communicate with access point 105-*a* on both a first hierarchical layer that supports first layer transmissions with a first subframe type and a second hierarchical layer that supports second layer transmissions with a second subframe type. For example, access point 105-*a* may transmit subframes of the second subframe type that are time division duplexed with subframes of the first subframe type.

In some examples, an access point 105-*a* may acknowledge receipt of a transmission by providing ACK/NACK for the transmission through, for example, a HARQ scheme. Acknowledgments from the access point 105-*a* for transmissions in the first hierarchical layer may be provided, in some examples, after a predefined number of subframes following the subframe in which the transmission was received. The time required to transmit an ACK/NACK and receive a retransmission may be referred to as round trip time (RTT), and thus subframes of the second subframe type may have a second RTT that is shorter than a RTT for subframes of the first subframe type.

In other examples, a second layer UE 115-*b* may communicate with access point 105-*b* on the second hierarchical layer only. Thus, hybrid UE 115-*a* and second layer UE 115-*b* may belong to a second class of UEs 115 that may communicate on the second hierarchical layer, while legacy UEs 115 may belong to a first class of UEs 115 that may communicate on the first hierarchical layer only. Thus, second layer UE 115-*b* may operate with reduced latency compared to UEs 115 that operate on the first hierarchical layer.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies. The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In LTE network communication systems, the terms evolved Node B (eNodeB or eNB) may be generally used to describe the access points 105. The wireless communications system 100 may be a Heterogeneous LTE/ULL (ultra low latency) LTE network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs 115 with service subscriptions with the network provider. A small cell would generally cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via a backhaul 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. Furthermore, transmissions in the first hierarchical layer and second hierarchical layer may or may not be synchronized among access points 105. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. Some examples of UEs may include cellular phones, smart phones, personal digital assistants (PDAs), wireless modems, handheld devices, tablets, laptop computers, netbooks, smartbooks, ultrabooks, wearables (e.g., smart watch, smart bracelet, smart glasses, virtual reality goggles, smart ring, smart clothing), gaming devices, entertainment devices, cameras, music players, medical devices, healthcare devices, vehicular devices, navigation/positioning devices, etc. Some UEs may be considered enhanced or evolved machine-type communication(s) (eMTC) UEs that may communicate with a base station, another device (e.g., remote device), or some other entity. MTC may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. MTC UEs may include drones, robots/robotic devices, sensors, meters, cameras, monitors, location tags, etc. MTC UEs, as well as other types of UEs, may include interne of everything (IoE) or internet-of-things (IoT) devices, such as NB-IoT (narrowband internet-of-things) devices. A UE 115 may be able to communicate with macro eNodeBs, small cell eNodeBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communications links 125 may carry transmissions of each hierarchical layer which, in some examples, may be multiplexed in the communications links 125. The UEs 115 may be configured to collaboratively communicate with multiple access points 105 through, for example, Multiple Input Multiple Output (MIMO), carrier aggregation (CA), Coordinated Multi-Point (CoMP), or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

As mentioned, in some examples access points 105 and UEs 115 may utilize carrier aggregation (CA) to transmit on multiple carriers. In some examples, access points 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. Hybrid UE 115-*a*, and/or second layer UE 115-*b* may, in certain examples, receive and/or transmit one or more subframes in a second hierarchical layer utilizing a single carrier that has a bandwidth greater than a bandwidth of one or more of the separate carriers. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined with other techniques to provide shorter RTTs such as described above, to provide further enhanced data rates.

Each of the different operating modes that may be employed by wireless communication system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communications links 125 for LTE downlink transmissions for each hierarchical layer, while single carrier frequency division multiple access (SC-FDMA) communications signals may be used in the communications links 125 for LTE uplink transmissions in each hierarchical layer. Additional details regarding implementation of hierarchical layers in a system such as the wireless communications system 100, as well as other features and functions related to communications in such systems, are provided below with reference to the following figures.

Figure 2:
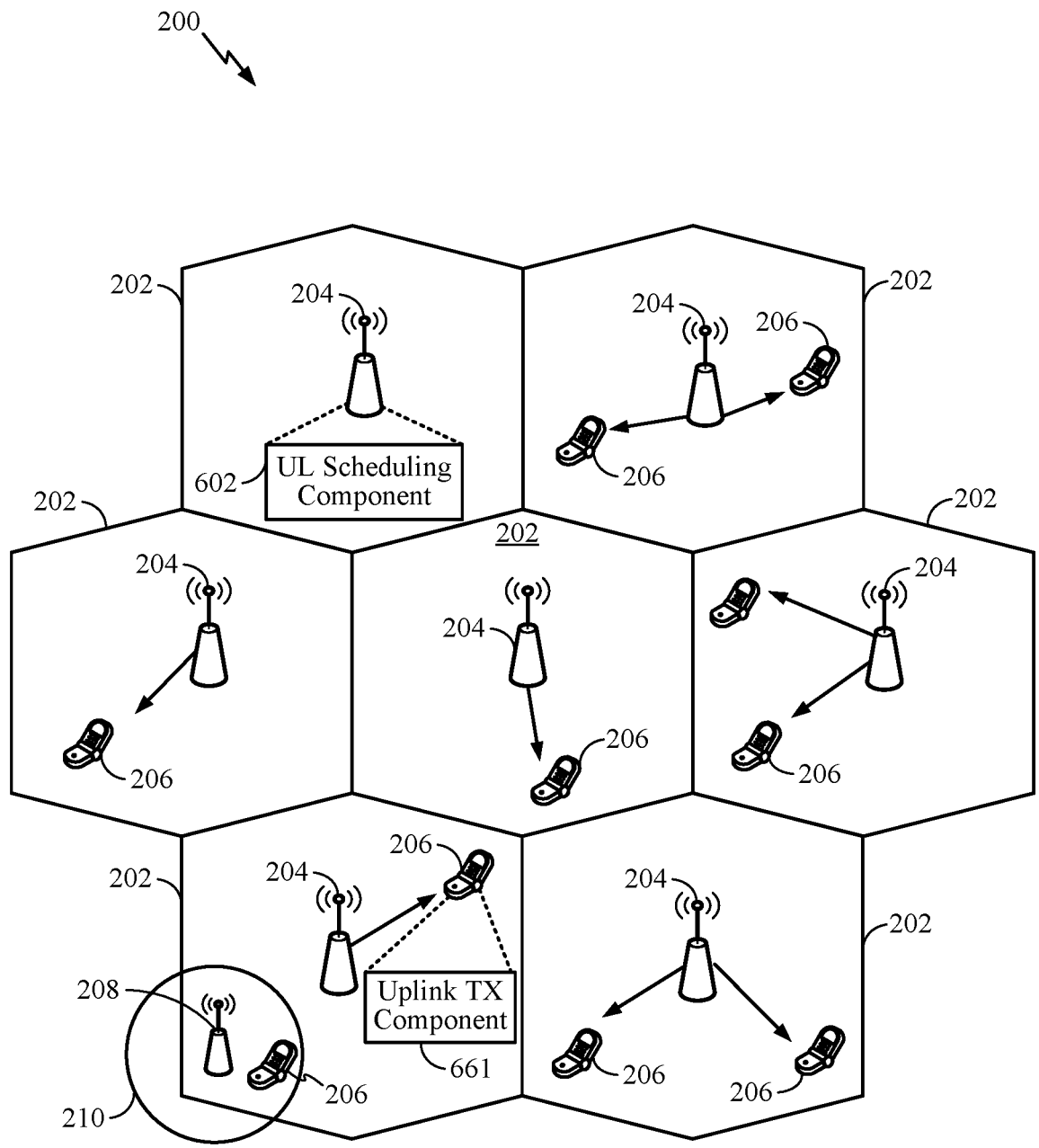
FIG. 2 is a diagram illustrating an example of an access network, in accordance with certain aspects of the present disclosure.

FIG. 2 is a diagram illustrating an example of an access network 200 in an LTE network architecture, in accordance with certain aspects of the present disclosure. In this example, the access network 200 is divided into a number of cellular regions (cells) 202. One or more lower power class eNBs 208 may have cellular regions 210 that overlap with one or more of the cells 202. The lower power class eNB 208 may be a small cell such as a femto cell (e.g., home eNB (HeNB)), pico cell, micro cell, or remote radio head (RRH). The macro eNBs 204 are each assigned to a respective cell 202 and are configured to provide an access point to the evolved packet core (EPC) for all the UEs 206 in the cells 202. Similarly, one or more of UEs 206 may include an uplink transmitter component 661 configured to transmit, decode and operate using the data structure. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
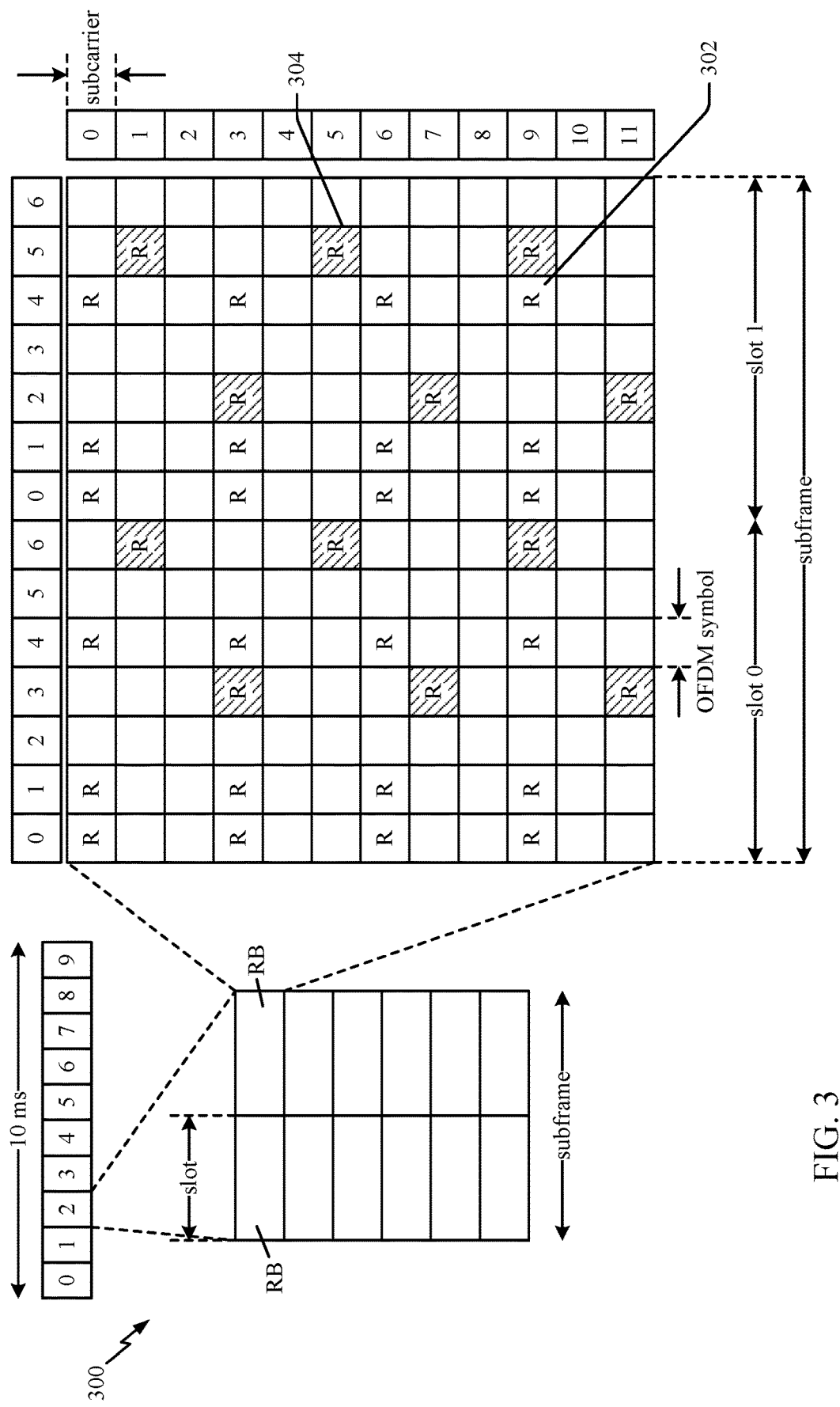
FIG. 3 is a diagram illustrating an example of a DL frame structure in LTE, in accordance with certain aspects of the present disclosure.

FIG. 3 is a diagram 300 illustrating an example of a DL frame structure in LTE, in accordance with certain aspects of the present disclosure. A frame (10 ms) may be divided into 10 equally sized sub-frames. Each sub-frame may include two consecutive time slots. A resource grid may be used to represent two time slots, each time slot including a resource element block. The resource grid is divided into multiple resource elements (REs). In LTE, a resource element block may contain 12 consecutive subcarriers in the frequency domain and, for a normal cyclic prefix in each OFDM symbol, 7 consecutive OFDM symbols in the time domain, or 84 resource elements. For an extended cyclic prefix, a resource element block may contain 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource element blocks upon which the corresponding PDSCH is mapped. The number of bits carried by each resource element depends on the modulation scheme. Thus, the more resource element blocks that a UE receives and the higher the modulation scheme, the higher the data rate for the UE.

In LTE, an eNB may transmit a primary synchronization signal (PSS) and a secondary synchronization signal (SSS) on the downlink in the center of the system bandwidth for each cell supported by the eNB. The PSS and SSS may be transmitted in symbol periods 6 and 5, respectively, in subframes 0 and 5 of each radio frame with the normal cyclic prefix. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Figure 4:
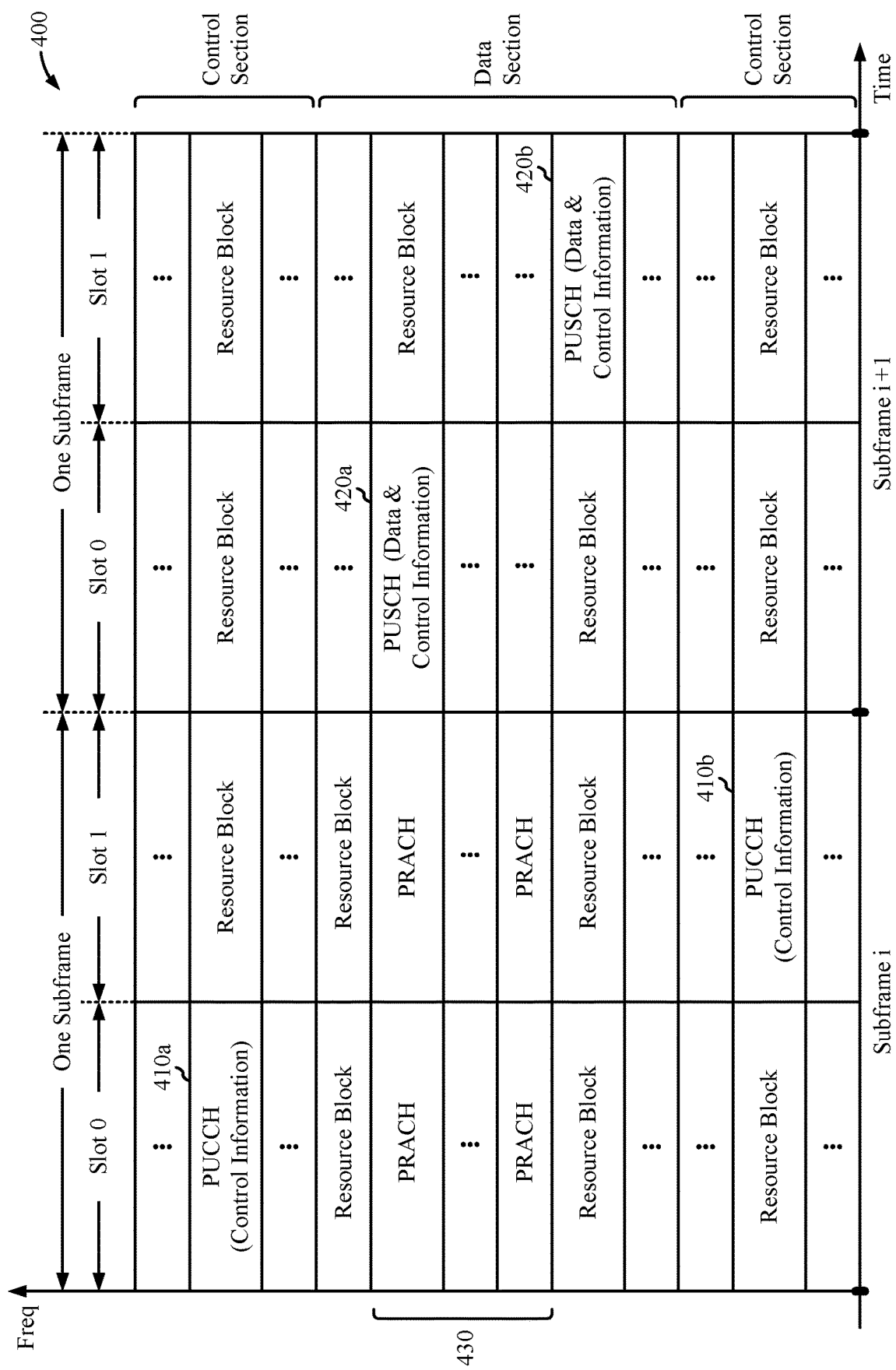
FIG. 4 is a diagram illustrating an example of an UL frame structure in LTE, in accordance with certain aspects of the present disclosure.

FIG. 4 is a diagram 400 illustrating an example of an UL frame structure in LTE, in accordance with certain aspects of the present disclosure. The available resource element blocks for the UL may be partitioned into a data section and a control section. The control section may be formed at the two edges of the system bandwidth and may have a configurable size. The resource element blocks in the control section may be assigned to UEs for transmission of control information. The data section may include all resource element blocks not included in the control section. The UL frame structure results in the data section including contiguous subcarriers, which may allow a single UE to be assigned all of the contiguous subcarriers in the data section.

A UE may be assigned resource element blocks 410a, 410b in the control section to transmit control information to an eNB. The UE may also be assigned resource element blocks 420a, 420b in the data section to transmit data to the eNB. The UE may transmit control information in a physical UL control channel (PUCCH) on the assigned resource element blocks in the control section. The UE may transmit only data or both data and control information in a physical UL shared channel (PUSCH) on the assigned resource element blocks in the data section. A UL transmission may span both slots of a subframe and may hop across frequency.

A set of resource element blocks may be used to perform initial system access and achieve UL synchronization in a physical random access channel (PRACH) 430. The PRACH 430 carries a random sequence and may not carry any UL data/signaling. Each random access preamble occupies a bandwidth corresponding to six consecutive resource element blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
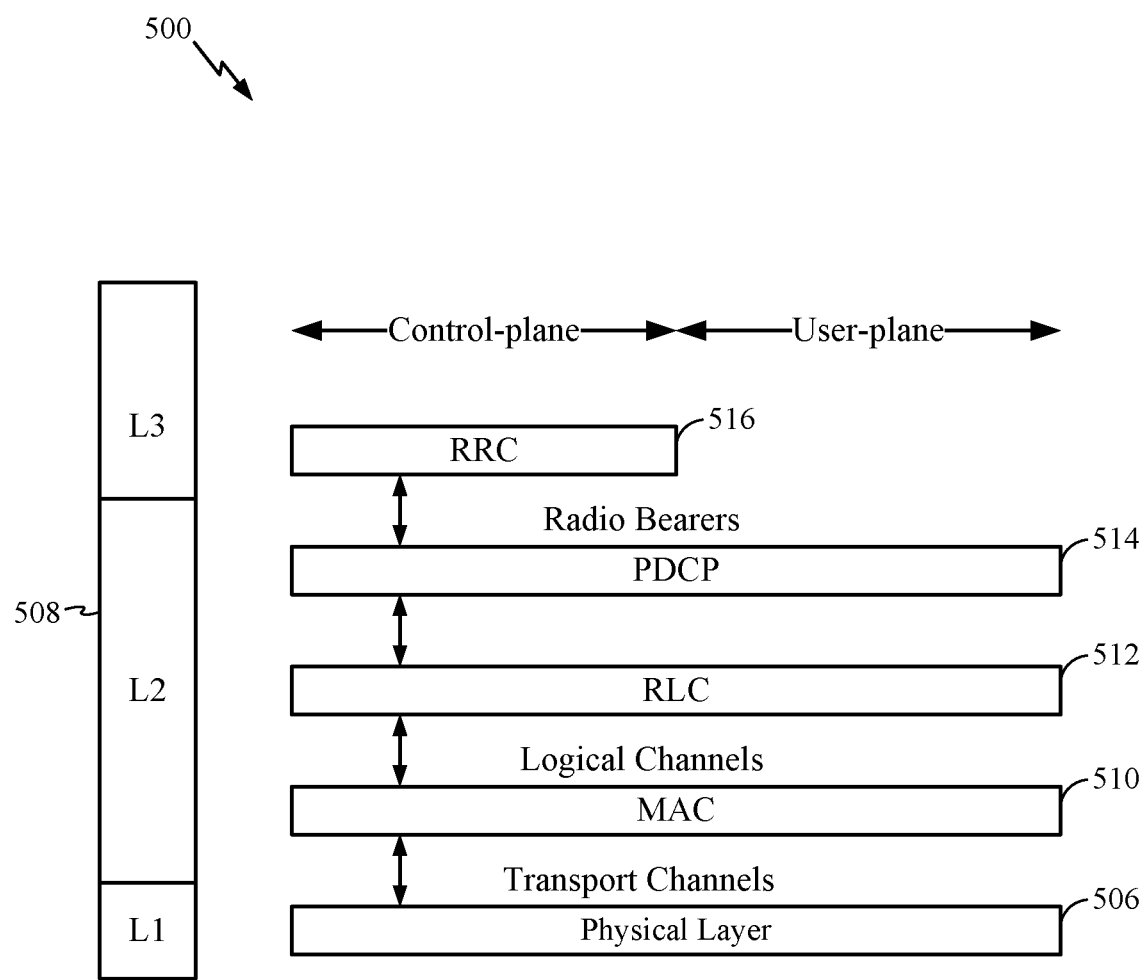
FIG. 5 is a diagram illustrating an example of a radio protocol architecture for the user and control planes, in accordance with certain aspects of the present disclosure.

FIG. 5 is a diagram 500 illustrating an example of a radio protocol architecture for the user and control planes in LTE, in accordance with certain aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource element blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
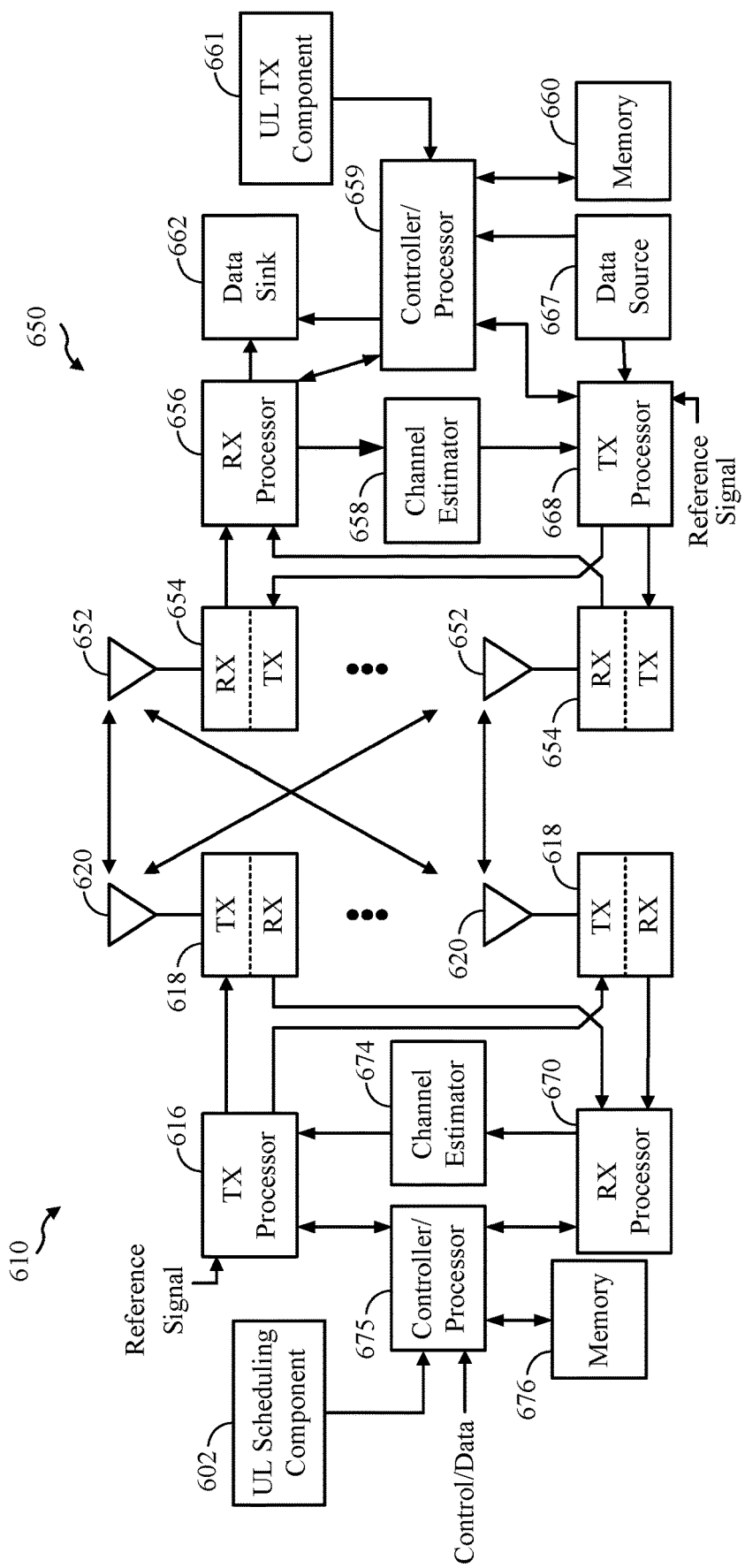
FIG. 6 is a diagram illustrating an example of an evolved Node B and user equipment in an access network, in accordance with certain aspects of the present disclosure.

FIG. 6 is a block diagram of an eNB 610 in communication with a UE 650 in an access network, in accordance with certain aspects of the present disclosure. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650. The controller/processor 675 can direct/carry out various operations of eNB 610 (e.g., operations illustrated in association with FIG. 12).

The transmit (TX) processor 616 implements various signal processing functions for the L1 layer (physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission. In addition, eNB 610 may include an uplink scheduling component 602 configured to expedite communication of control information and user data with the number of UEs 650 according to aspects of the present disclosure.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations. The controller/processor 659 can direct or carry out various operations of UE 650 (e.g., operations illustrated in association with FIG. 11). In addition, UE 650 may include an uplink transmitter component 661 configured to receive, decode and operate using the data structure of aspects of the present disclosure.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controller/processor 675 may direct or carry out various operations of eNB 610 (e.g., operations illustrated in association with FIG. 12).

According to certain aspects, LTE compatible very narrow band design communications (VNB) (e.g., narrowband internet of things (NB-IoT)) may be enabled by the use of narrowband transmissions spanning no more than a single resource block (RB) in a transmission time interval (TTI), as compared to current LTE implementations, which require at least 1.4 MHz of bandwidth consisting of six RBs. Limiting bandwidth to a single 180 KHz RB for VNB communications may be used to reduce bandwidth requirements below that of current LTE implementations.

Current LTE implementations perform carrier acquisition and access by utilize the center 6 RBs for PSS/SSS/PBCH for downlink (DL) and RACH signaling in uplink, both of which requiring at least 6 RBs. Signaling utilizing one RB does not permit the center 6 RBs to be used. In some cases, PSS/SSS/PBCH/PRACH broadcasts, control and data signaling may be modified to fit entirely into VNB one-RB signaling. The one RB signal may continue to utilize half ms slots utilizing 12 subcarriers as shown in FIG. 3.

Figure 7:
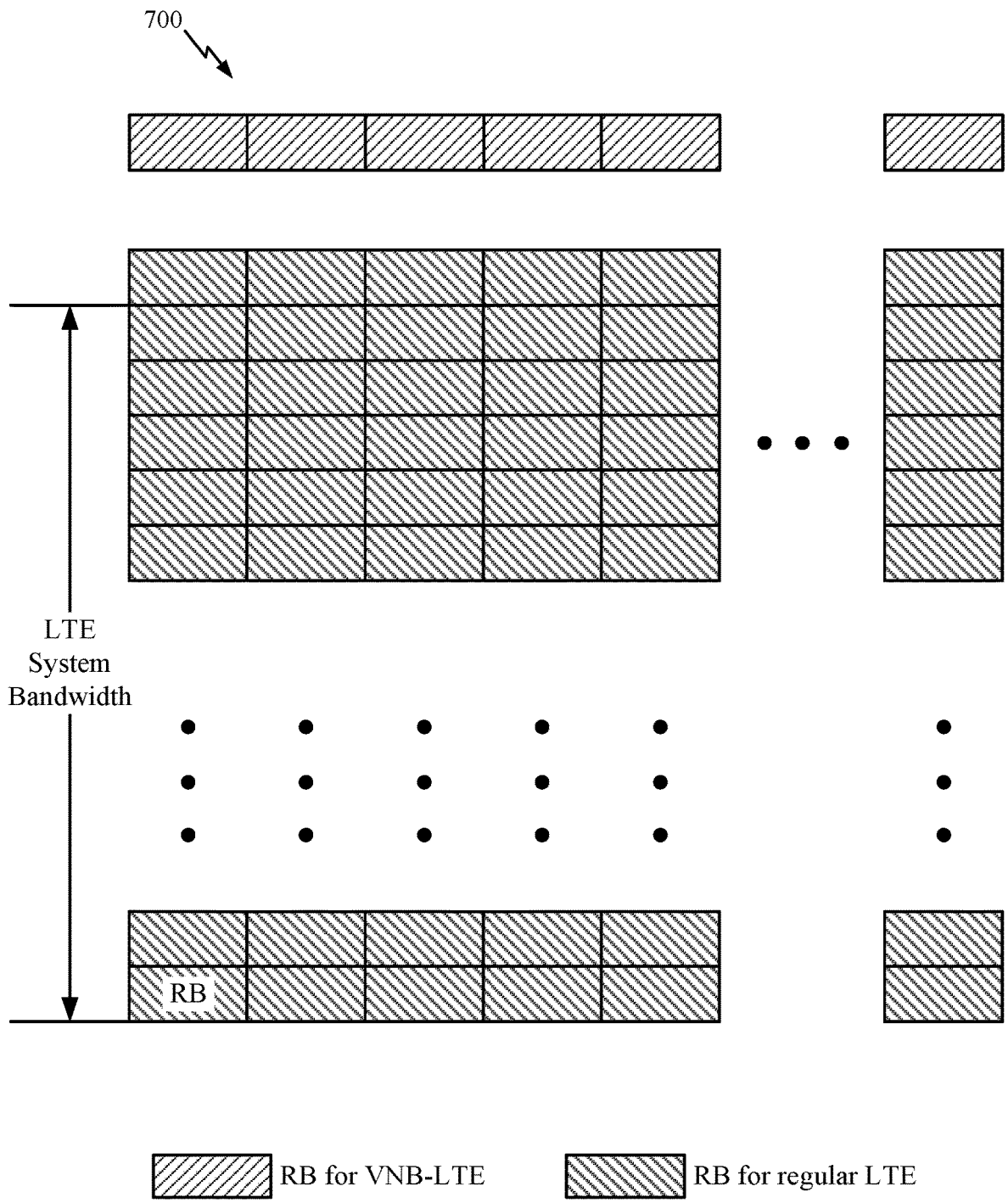
FIG. 7 illustrates an example narrowband frame structure within a separate carrier, in accordance with certain aspects of the present disclosure.

As illustrated in FIG. 7, a narrowband frame structure 700 may be carried on a separate carrier from existing LTE carriers. In such an example, existing LTE orthogonal frequency division multiplexing (OFDM) numerology may be reused. Non-acquisition and random access signals may also be carried out entirely based on VNB one-RB signaling. Where VNB is separate from a wideband LTE carrier, for example, location of the VNB may be signaled.

Cell specific reference signals (CRS) may continue to be reused (e.g., same initialization and/or tone location may be used) and scaled back to fit into one RB based on the reduced carrier bandwidth. Time division multiplexing (TDM) or frequency division multiplexing (FDM) may be utilized for user multiplexing (e.g., in downlink or uplink). For TDM, one UE may occupy 12 tones of the RB at any time with a single grant for each RB. Under FDM, multiple UEs share the 12 tones of the RB and each UE may be assigned a subset of the tones. Multiple grants for a RB may be used to assign this subset.

Downlink control and data channels may also be multiplexed. Symbol level TDM between control and data channels may be used, where the physical downlink control channel (PDCCH) occupies a few symbols of a subframe and the rest of the symbols may be used for physical downlink shared channel (PDSCH). For subframe level TDM between control and data channels, one subframe may be dedicated to PDCCH and subsequent subframes may be used for PDSCH. For FDM between control and data channels, a subset of the tones may be used for PDCCH and the rest of the tones used for PDSCH.

The PDCCH may span a single or multiple subframes and be interleaved across frequency and/or time with the PDSCH. All the REs for a few symbols (e.g., 4 symbols) may be used for PDCCH. Alternatively all REs for a subframe may be used for PDCCH.

Where coverage enhancement for PDCCH/ePDCCH TTI bundling is used, all the REs for a group of subframes may be used for PDCCH. Where there is only a single PDCCH per subframe, there is no search space as there are no control channel elements (CCEs). Where there are multiple PDCCHs resource element group (REG) concepts may be applied where a group of resource elements may be grouped in to a REG and a set of REGs may be grouped into a CCE search space.

Channel coding, interleaving, scrambling, modulation and other aspects of existing PDCCH design may be reused. The downlink control information (DCI) and uplink control information (UCI) formats (e.g., formats 0-3) may reused from existing PDCCH systems except that payload size may be reduced to account for the reduced bandwidth occupied by VNB. Channel coding, interleaving, scrambling, modulation, and other aspects of PDCCH may remain unchanged from existing PDCCH systems.

PDSCH may also span a single or multiple subframes (for example with TTI bundling) and be interleaved across frequency and/or time. Demodulation reference signals (DM-RS) and cell-specific reference (CRS) signals may be supported for demodulation for PDSCH.

Code-block segmentation, channel coding, interleaving, scrambling, modulation, and other aspects of the PDSCH design may also remain unchanged from existing PDSCH of the LTE systems. Additionally, convolutional (e.g., via Viterbi decoder) code may be used instead of turbo code for encoding. While turbo codes may have better error correction capabilities for a given complexity, the very small payloads for VNB packets may make convolutional code more suitable.

Multiplexing control and data channel on the uplink may be performed using TDM. Subframe level TDM between PUCCH, PUSCH, and PRACH may performed such that certain subframes are configured for PUCCH or PRACH, and the rest of the subframes are available for PUSCH.

Sounding reference signals (SRS) in the uplink may be configured as in LTE with a shortened PUSCH subframe, only within the single RB. Code-block segmentation, channel coding, interleaving, scrambling, modulation, and other aspects of PUSCH design may remain unchanged from existing PUSCH systems. Additionally, convolutional code (e.g., via Viterbi decoder) may also be used for PUSCH rather than a turbo code. For PUCCH, inter-subframe hopping is supported with frequency retuning between subframes. Intra-subframe hopping may not be supported. Other aspects of PUCCH may remain unchanged from existing PUCCH systems.

On the UL, TDM between PUCCH and PUSCH makes utilizing existing synchronous HARQ designs with fixed retransmit times difficult. In certain cases, an asynchronous HARQ may be utilized for PUSCH where retransmit times may be based on a grant. This allows for the retransmit time to be adjusted as needed.

Figure 8:
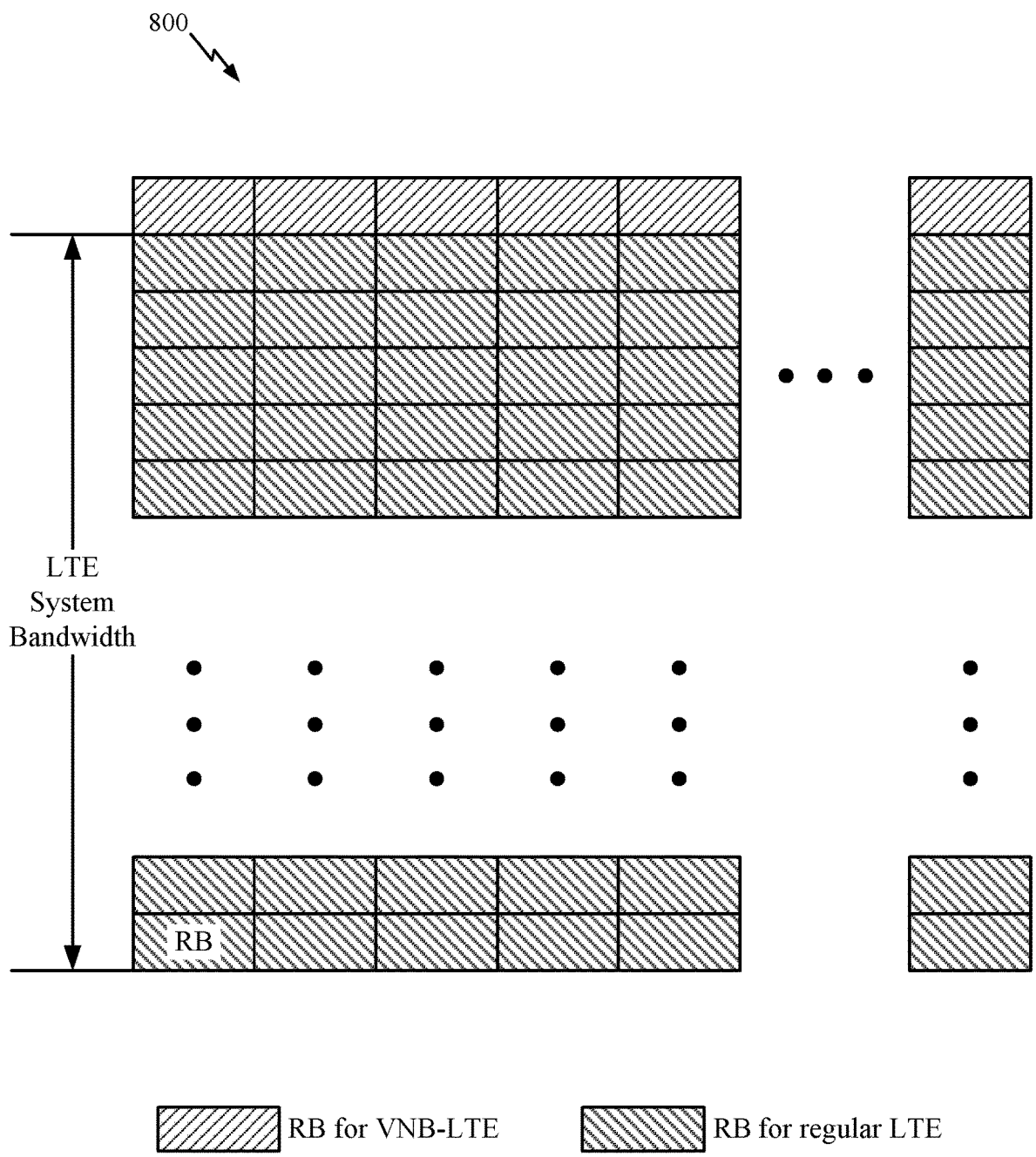
FIG. 8 illustrates a narrowband frame structure within the guard band of a wide-band LTE carrier.

Additionally, as illustrated in FIG. 8, a narrowband frame structure 800 may be carried in the guard band of a wideband LTE carrier. LTE implementations include unused portions of radio spectrum between carriers to guard against interference between adjacent carriers. In some cases, this guard band may be used for VNB.

In some cases, it may be desirable to reuse existing LTE carriers to minimize implementation impact, and to retain compatibility. By sharing the existing LTE OFDM numerology as well as portions of existing PDCCH, PDSCH, PUSCH and PUCCH, VNB designs (e.g., NB-IoT) may be able to coexist within existing LTE carriers, helping to ease implementation issues. For example, where VNB implementations coexist with LTE carriers, acquisition and access may be based on current LTE techniques and once connected, the UE may fall into VNB operations. This frees up bandwidth on VNB that may otherwise be used for signal acquisition and access. In another example, acquisition and access may be carried entirely in the RB of the VNB-LTE, independent of the regular LTE systems.

Figure 9:
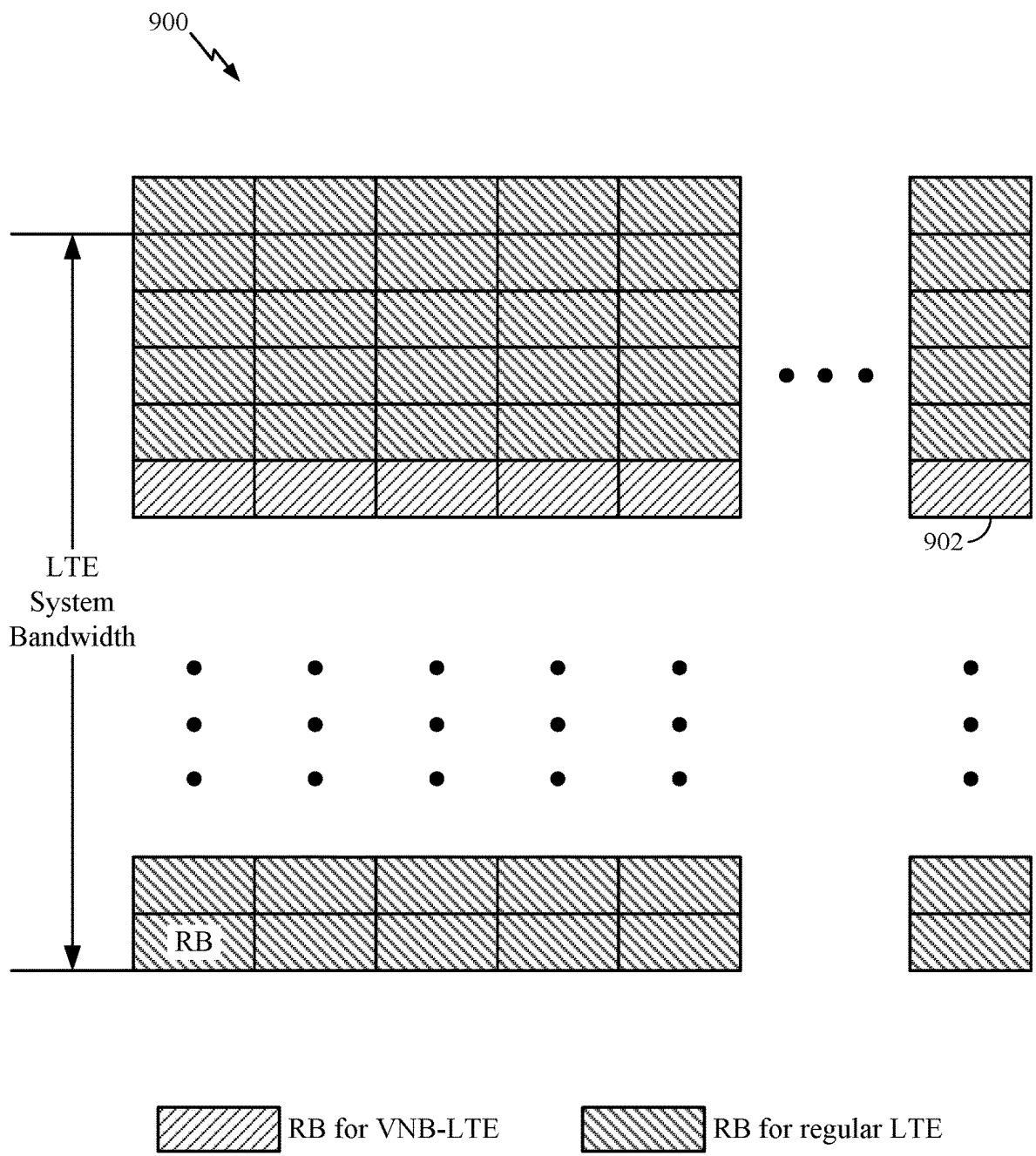
FIGS. 9 and 10 illustrate example narrowband frame structures within a wideband LTE carrier.
Figure 10:
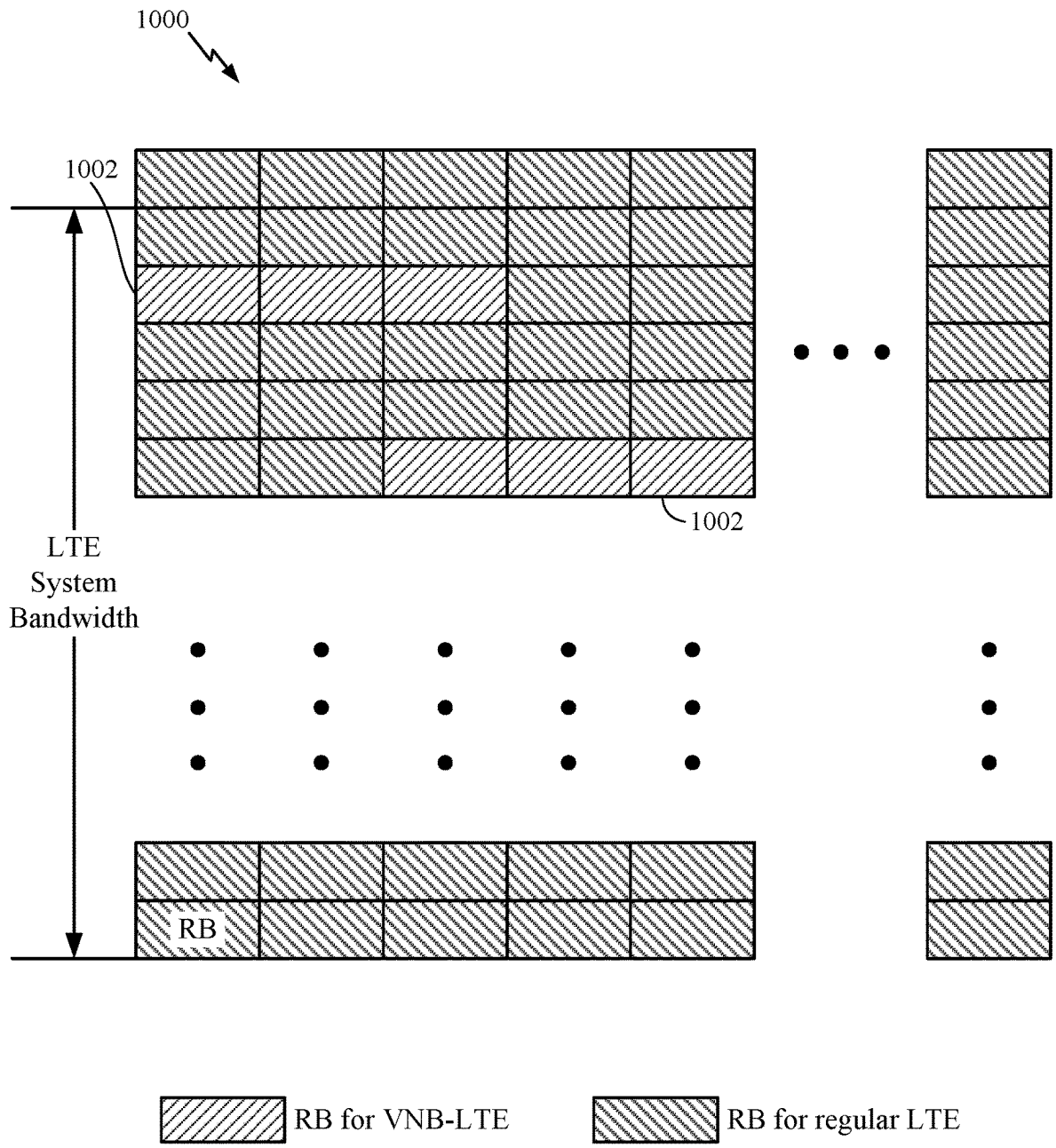

FIGS. 9 and 10 illustrate example narrowband frame structures 900 and 1000 within a wideband LTE carrier. In FIG. 9, all of the subframes within a set of RB within the wideband LTE is reserved for VNB 902. In FIG. 10, only a subset of the subframes of the RBs are reserved for VNB 1002. Where VNB is within a wideband LTE carrier, for example, an RB offset within the wideband LTE carrier may be signaled as a part of common signaling, for example by SIB.

A VNB UE may receive this RB offset to determine the relative location of the VNB within the wideband LTE and figure out the CRS sequence. In one aspect, CRS may continue to be reused. In another aspect, VNB CRS may be slightly different from CRS (e.g., using different symbols, same initialization and/or tone location, etc.). Using the LTE carrier for acquisition and access may be performed even when VNB does not coexist within the LTE carrier. For example, while the VNB of FIG. 7 is on a separate carrier from the LTE carrier, the LTE carrier may still provide acquisition and access and direct UE to the VNB carrier. However, control plane signaling may still be performed based on VNB one RB signaling despite coexisting with existing LTE implementations.

Figure 11:
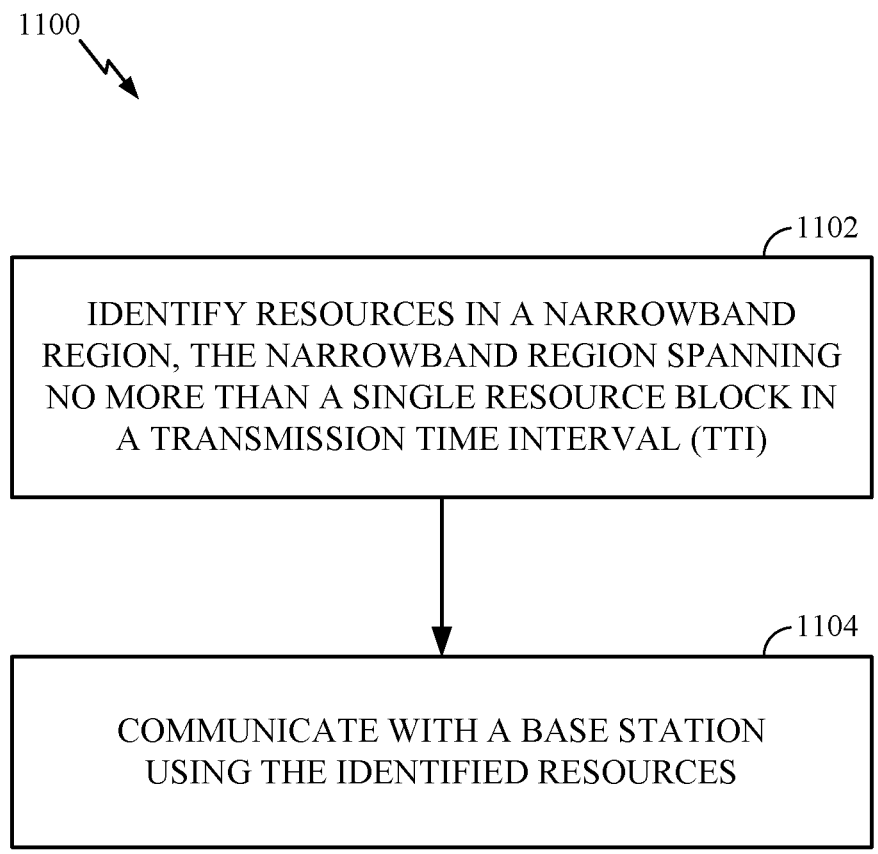
FIG. 11 illustrates operations for wireless communications, in accordance with certain aspects of the present disclosure.

FIG. 11 illustrates example operations 1100 for LTE compatible very narrow band design, in accordance with aspects of the present disclosure. The operations 1100 may be performed, for example, by a UE.

The operations 1100 begin, at 1102, where the UE identifies resources in a narrowband region, the narrowband region spanning no more than a single resource block in a transmission time interval (TTI). At 1104, the UE communicates with a base station using the identified resources.

Figure 12:
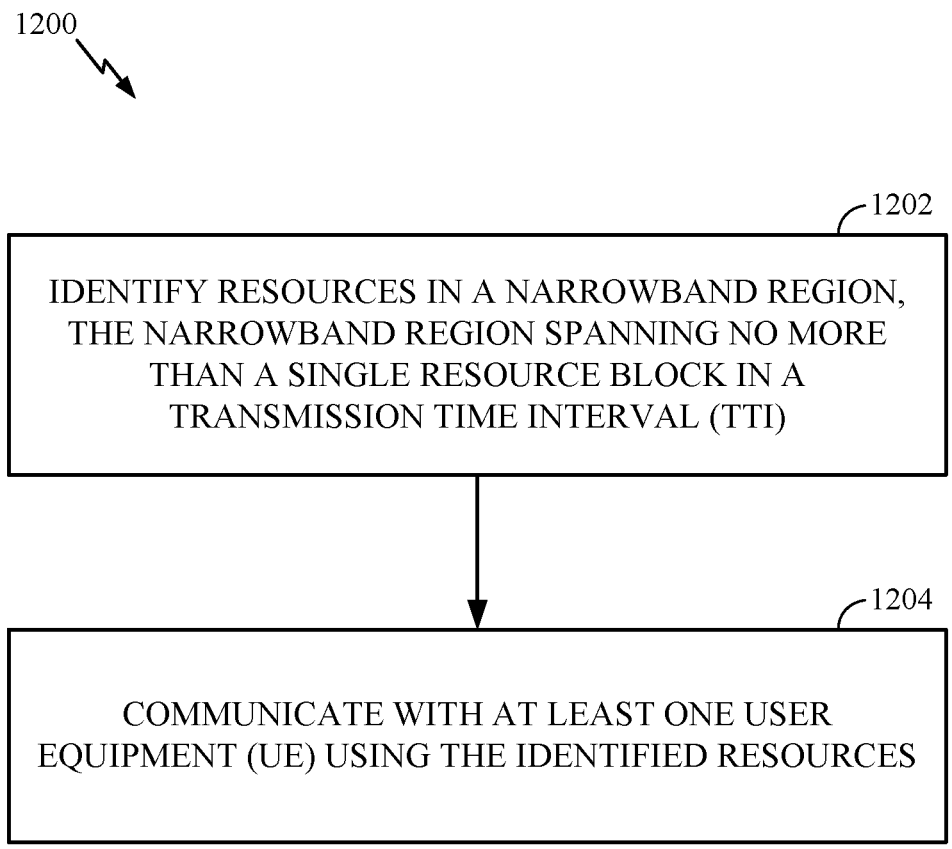
FIG. 12 illustrates operations for wireless communications, in accordance with certain aspects of the present disclosure.

FIG. 12 illustrates example operations 1200 for LTE compatible very narrow band design, in accordance with aspects of the present disclosure. The operations 1200 may be performed, for example, by a base station (BS). The operations 1200 begin, at 1202, where the BS identifies resources in a narrowband region, the narrowband region spanning no more than a single resource block in a transmission time interval (TTI). At 1204, the BS communicates with at least one UE using the identified resources.

The various operations of methods described above may be performed by any suitable means capable of performing the corresponding functions. The means (e.g., means for identifying, means for communicating, etc.) may include various hardware and/or software component(s) and/or module(s) (e.g., in connection with UE 650 and eNB 610 of FIG. 6), including, but not limited to a circuit, transceiver, antenna, an application specific integrated circuit (ASIC), or processor. Generally, where there are operations illustrated in the Figures, those operations may be performed by any suitable corresponding counterpart means plus function components.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as hardware, software, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination thereof. A software module may reside in RAM memory, flash memory, PCM (phase change memory), ROM memory, EPROM memory, EEPROM memory, registers, hard disk, a removable disk, a CD ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, or combinations thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available medium that can be accessed by a general purpose or special purpose computer. By way of example, and not limitation, such computer-readable media can comprise RAM, ROM, EEPROM, flash memory, PCM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

As used herein, a phrase referring to "at least one of" a list of items refers to any combination of those items, including single members. For example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). The term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. The articles "a" and "an" as used in this application and the appended claims should generally be construed to mean "one or more" unless specified otherwise or clear from the context to be directed to a singular form.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE), comprising:
   identifying resources in a narrowband, the narrowband spanning no more than a single 180 kilohertz resource block in a transmission time interval (TTI); and
   communicating with a base station using the identified resources,
   wherein the narrowband supports frequency division multiplexing of multiple UEs, wherein the multiple UEs share a plurality of subcarriers of the narrowband and each of the multiple UEs is assigned one or more subcarriers from the plurality of subcarriers.

2. The method of claim 1, wherein:
   the UE is of a first type; and
   the narrowband is located within a wideband region of resources used for communications by UEs of a second type.

3. The method of claim 2, further comprising:
   receiving signaling of a resource block offset indicating a location of the narrowband.

4. The method of claim 1, wherein:
   the UE is of a first type; and
   the narrowband is located within a separate component carrier outside of a wideband region of resources used for communications by UEs of a second type.

5. The method of claim 1, wherein the communicating comprises:
   receiving at least one of synchronization signals, broadcast information, or cell-specific reference signals from the base station on the identified resources.

6. The method of claim 1, wherein the communicating comprises:
   transmitting a physical random access channel (PRACH) on the identified resources.

7. The method of claim 1, wherein the UE supports time division multiplexing of at least one narrowband downlink control channel and at least one narrowband downlink shared channel across multiple TTIs.

8. The method of claim 1, wherein at least one control channel and at least one data channel are time division multiplexed within a given TTI.

9. The method of claim 1, wherein at least one control channel and at least one data channel are frequency division multiplexed within a given TTI.

10. The method of claim 1, wherein the communicating comprises:
    receiving a physical downlink control channel (PDCCH) on the identified resources.

11. The method of claim 1, wherein the communicating comprises:
    receiving a physical downlink shared channel (PDSCH) on the identified resources.

12. The method of claim 1, wherein:
    at least some TTIs are available for physical uplink control channel (PUCCH) transmissions; and
    at least some TTIs are available for physical random access channel (PRACH) transmissions.

13. The method of claim 1, wherein the communicating comprises:
    performing at least one of system acquisition or access using the identified resources.

14. The method of claim 1, wherein communicating with the base station comprises sending one or more transmissions to the base station on a narrowband uplink shared channel.

15. A method for wireless communications by a base station (BS), comprising:
    identifying resources in a narrowband, the narrowband spanning no more than a single 180 kilohertz resource block in a transmission time interval (TTI); and
    communicating with at least one user equipment (UE) using the identified resources,
    wherein the narrowband supports frequency division multiplexing of multiple UEs, wherein the multiple UEs share a plurality of subcarriers of the narrowband and each of the multiple UEs is assigned one or more subcarriers from the plurality of subcarriers.

16. The method of claim 15, wherein:
    the at least one UE is of a first type; and
    the narrowband is located within a wideband region of resources used for communications by UEs of a second type.

17. The method of claim 16, further comprising:
    sending signaling, to the at least one UE, of a resource block offset indicating a location of the narrowband.

18. The method of claim 15, wherein:
    the at least one UE is of a first type; and
    the narrowband is located within a separate component carrier outside of a wideband region of resources used for communications by UEs of a second type.

19. The method of claim 15, wherein the communicating comprises:
    transmitting at least one of synchronization signals, broadcast information, or cell-specific reference signals from the base station on the identified resources.

20. The method of claim 15, wherein the communicating comprises:
    receiving a physical random access channel (PRACH) on the identified resources.

21. The method of claim 15, wherein the UE supports time division multiplexing of at least one narrowband downlink control channel and at least one narrowband downlink shared channel across multiple TTIs.

22. The method of claim 15, wherein at least one control channel and at least one data channel are time division multiplexed within a given TTI.

23. The method of claim 15, wherein at least one control channel and at least one data channel are frequency division multiplexed within a given TTI.

24. The method of claim 15, wherein the communicating comprises:
transmitting a physical downlink control channel (PDCCH) on the identified resources.

25. The method of claim 15, wherein the communicating comprises:
transmitting a physical downlink shared channel (PDSCH) on the identified resources.

26. The method of claim 15, wherein:
at least some TTIs are available for receiving physical uplink control channel (PUCCH) transmissions; and
at least some TTIs are available for receiving physical random access channel (PRACH) transmissions.

27. The method of claim 15, wherein the communicating comprises:
participating with the at least one UE in at least one of system acquisition or access using the identified resources.

28. A user equipment (UE) for wireless communications, comprising:
at least one processor; and
a memory coupled to the at least one processor for storing instructions, the instructions executable by the at least one processor to cause the UE to:
identify resources in a narrowband, the narrowband spanning no more than a single 180 kilohertz resource block in a transmission time interval (TTI); and
communicate with a base station using the identified resources,
wherein the narrowband supports frequency division multiplexing of multiple UEs, wherein the multiple UEs share a plurality of subcarriers of the narrowband and each of the multiple UEs is assigned one or more subcarriers from the plurality of subcarriers.

29. An apparatus for wireless communications, comprising:
at least one processor; and
a memory coupled to the at least one processor for storing instructions, the instructions executable by the at least one processor to cause the apparatus to:
identify resources in a narrowband, the narrowband spanning no more than a single 180 kilohertz resource block in a transmission time interval (TTI); and
communicate with at least one user equipment (UE) using the identified resources,
wherein the narrowband supports frequency division multiplexing of multiple UEs, wherein the multiple UEs share a plurality of subcarriers of the narrowband and each of the multiple UEs is assigned one or more subcarriers from the plurality of subcarriers.

30. A user equipment (UE) for wireless communications, comprising:
means for identifying resources in a narrowband, the narrowband spanning no more than a single 180 kilohertz resource block in a transmission time interval (TTI); and
means for communicating with a base station using the identified resources,
wherein the narrowband supports frequency division multiplexing of multiple UEs, wherein the multiple UEs share a plurality of subcarriers of the narrowband and each of the multiple UEs is assigned one or more subcarriers from the plurality of subcarriers.

31. An apparatus for wireless communications, comprising:
means for identifying resources in a narrowband, the narrowband spanning no more than a single 180 kilohertz resource block in a transmission time interval (TTI); and
means for communicating with at least one user equipment (UE) using the identified resources,
wherein the narrowband supports frequency division multiplexing of multiple UEs, wherein the multiple UEs share a plurality of subcarriers of the narrowband and each of the multiple UEs is assigned one or more subcarriers from the plurality of subcarriers.

32. A non-transitory computer-readable medium for wireless communications by a user equipment (UE), comprising:
code to identify resources in a narrowband, the narrowband spanning no more than a single 180 kilohertz resource block in a transmission time interval (TTI); and
code to communicate with a base station using the identified resources,
wherein the narrowband supports frequency division multiplexing of multiple UEs, wherein the multiple UEs share a plurality of subcarriers of the narrowband and each of the multiple UEs is assigned one or more subcarriers from the plurality of subcarriers.

33. A non-transitory computer-readable medium for wireless communications, comprising:
code to identify resources in a narrowband, the narrowband spanning no more than a single 180 kilohertz resource block in a transmission time interval (TTI); and
code to communicate with at least one user equipment (UE) using the identified resources,
wherein the narrowband supports frequency division multiplexing of multiple UEs, wherein the multiple UEs share a plurality of subcarriers of the narrowband and each of the multiple UEs is assigned one or more subcarriers from the plurality of subcarriers.

* * * * *